United States Patent [19]

Cole et al.

[11] 4,449,359
[45] May 22, 1984

[54] AUTOMATIC VENT FOR FUEL CONTROL

[75] Inventors: Edward F. Cole, Glastonbury; Dean H. Crombie, Ellington, both of Conn.

[73] Assignee: United Technologies Corporation, Hartford, Conn.

[21] Appl. No.: 277,492

[22] Filed: Jun. 26, 1981

[51] Int. Cl.³ ............................................. F02C 9/28
[52] U.S. Cl. .............................. 60/39.094; 60/39.281
[58] Field of Search ............... 60/39.09 F, 39.28 R, 60/734, 39.094, 39.281; 137/255, 256, 513.3, 513.5, 513.7; 417/435; 244/135 R, 135 C

[56] References Cited

U.S. PATENT DOCUMENTS

| | | | |
|---|---|---|---|
| 2,557,438 | 6/1951 | Johnson | 137/256 |
| 3,508,940 | 2/1976 | Risse et al. | 137/255 |
| 3,808,798 | 5/1974 | Taylor | 137/513.5 |
| 3,982,399 | 9/1976 | Rookey | 137/255 |
| 4,021,155 | 5/1977 | Erickson et al. | 417/435 |

*Primary Examiner*—Louis J. Casaregola
*Attorney, Agent, or Firm*—Norman Friedland

[57] ABSTRACT

This invention relates to the fuel system of a gas turbine power plant and modifies a conventional fuel control to automatically vent trapped air contained in the fuel control and fuel distribution system into the engine's burners by bypassing the conventional minimum pressure and shut off valve. This serves to prime the main fuel pumps when running dry during the switching of one fuel tank to another.

1 Claim, 1 Drawing Figure

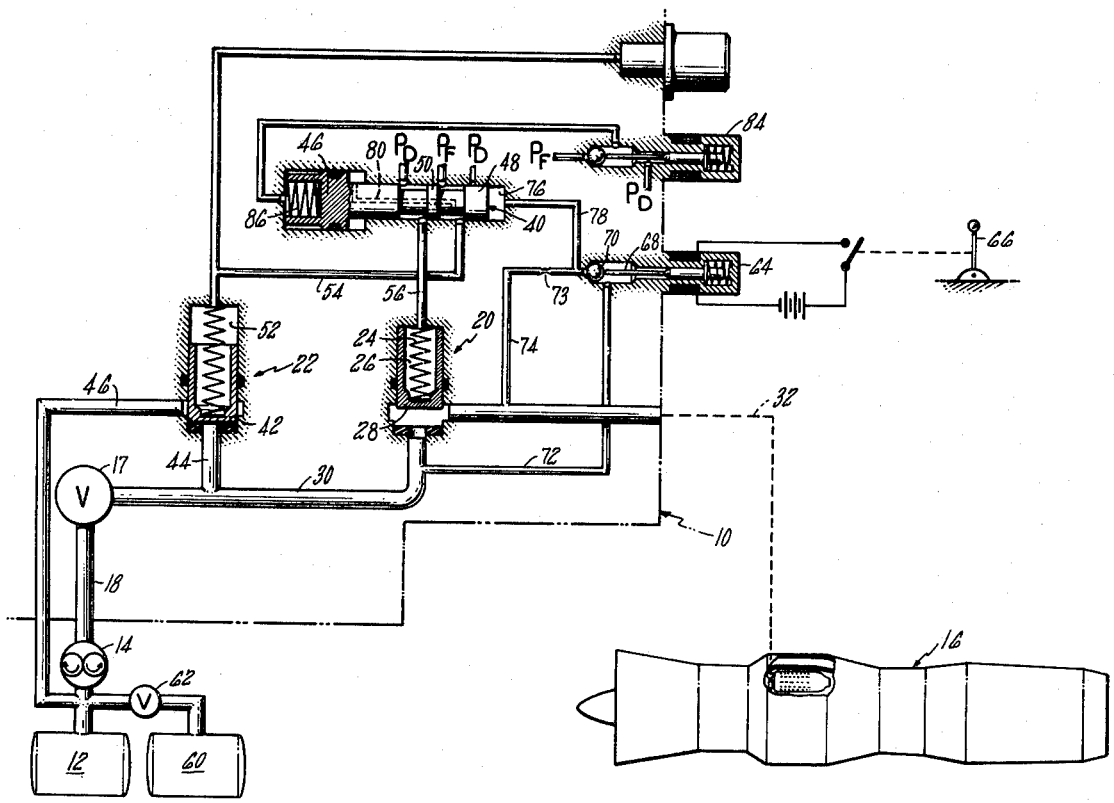

AUTOMATIC VENT FOR FUEL CONTROL

DESCRIPTION

1. Technical Field

This invention relates to fuel controls for a gas turbine engine and particularly to a vent bypass restriction that allows priming the main fuel pump which may run dry whenever alternate fuel tanks are switched on-line.

2. Background Art

A potential problem that is incidental to switching from one tank of fuel to an alternate one is the inability to attain sufficient pressure in the main fuel pump when running dry. In heretofore known fuel systems, an overboard vent has been incorporated, which vent was manually opened and closed to expunge the air so as to allow the pump to be primed. Typically, the vent would be opened by an operator in the aircraft cockpit in the event the tank is allowed to run dry prior to switching to the alternate fuel tank. This would allow expulsion of trapped air in the system permitting the dry running pump to lift fuel from the alternate tank to prime itself so as to be able to generate sufficient pressure to enable opening the minimum pressure and shut-off valve conventionally included in the fuel control. Without venting the air, the pump would not be capable of generating sufficient pressure to allow opening of this valve. Obviously, once primed, the vent would have to be closed by the operator to assure that fuel would not be inadvertently ejected overboard and for the same reason the vent must remain closed at all times unless repriming is required.

We have found we can obviate the problems noted above and particularly eliminate the necessity of having an operator manually open and close the vent valve by incorporating an automatic vent valve in the main fuel control. The vent valve is judiciously located to bypass the minimum pressure and shut-off valve whenever the fuel control is actuated to the "on" position, dumping trapped air into the engine's burners, rather than venting overboard. The system is relatively simple inasmuch as it merely requires the inclusion of a fixed restriction and the proper passages in a conventional fuel control.

DISCLOSURE OF INVENTION

An object of this invention is to provide for a gas turbine engine an improved air venting system to allow priming or repriming of the main fuel pump particularly when one fuel tank runs dry and an alternate one is switched on-line.

A feature is to provide a bypass line around the minimum pressure and shut-off valve of a conventional fuel control of a gas turbine engine, that is actuated concomitantly with the fuel control "on" switch so as to vent the trapped air and allow the dry running pump to lift fuel from the tank and build up sufficient pressure to open the otherwise closed minimum pressure and shut-off valve.

Other features and advantages will be apparent from the specification and claims and from the accompanying drawings which illustrate an embodiment of the invention.

BRIEF DESCRIPTION OF DRAWINGS

The sole FIGURE is a partial schematic of a conventional fuel control for a gas turbine engine illustrating the details of this invention.

BEST MODE FOR CARRYING OUT THE INVENTION

The invention can best be understood by reference to the sole FIGURE which shows in schematic fashion a partial view of the fuel control generally illustrated by reference numeral 10 metering fuel from tank 12, via pump 14 to the engine 16. For the sake of convenience and simplicity only that portion of the fuel control and fuel distribution system that is germain to the invention is shown and for a more detailed description of a conventional fuel control for a gas turbine engine and the engine itself reference is hereby made to the JFC-60 and JFC-68 fuel controls, and the JT-8D and JT-9D engines, manufactured by Hamilton Standard, and Pratt & Whitney Aircraft Group, respectively, both divisions of United Technologies Corporation, the assignee of this patent application.

As noted from the sole FIGURE, the pump 14 delivers pressurized fuel to the fuel control via line 18 where it is metered by a sophisticated control system (not shown) in order to maintain proper and optimum engine performance for the engine operating envelope. Typically, the fuel control contains a minimum pressure and shut-off valve 20 and a windmill bypass valve 22. The minimum pressure and shut-off valve 20 serves to assure that the fuel does not flow to the engine until it is at a predetermined minimum pressure value. This is established by the pressure and spring 24 in chamber 26 acting on the back side of the piston type valve element 28. In the position shown, the pressure in line 30 is sufficient to open valve 20 permitting fuel to flow to the fuel nozzles (not shown) of the engine 16 via line 32.

The sole FIGURE shows the fuel system in the normal mode of operation where the minimum pressure and shut-off valve 20 is open and the windmill bypass valve 22 is closed. Valve 22 is essentially identical in construction to valve 20 and serves to bypass metered fuel back to pump inlet whenever the minimum pressure and shut-off valve is commanded closed. This is accomplished by positioning the selector valve 40 to the right by applying high pressure ($P_F$) to the piston 46 of spool 48. Land 50 diverts drain pressure ($P_D$) behind piston valve element 42 instead of high pressure ($P_F$) and high pressure ($P_F$) behind valve element 28 instead of low pressure ($P_D$) as is shown in the FIGURE, this allows the pressurized fuel in line 30 and branch line 44 to urge valve element 42 upwardly and connect the bypass line 46 to bypass fuel around valve 17 into the pump inlet.

As noted, when the engine fuel flow is shut off by activating the shuttle valve 40 to the right, by applying high pressure ($P_F$) to the piston 46 of spool 48, land 50 connects chamber 52 to drain ($P_D$) via line 54 and chamber 26 to high pressure ($P_F$) via line 56. In this instance the windmill bypass valve 22 is allowed to open and minimum pressure and shut-off valve 20 is urged to close.

If the fuel tank 12 is allowed to run dry before fuel tank 60 is put in line by activating valve 62 pump 14 may run dry and air becomes trapped in the fuel control and fuel distribution system. As mentioned above, it is necessary to vent the trapped air so that pump 14 is enabled to lift fuel from tank 60 and pressurize line 30 and hence force the minimum pressure and shut-off valve 20 to open.

To this end and in accordance with this invention the start-up solenoid 64 is energized by the manual actuation of the condition lever 66 located in the aircraft cockpit. Energizing the circuit which may include a relay, causes plunger 68 to move rightwardly so as to allow ball valve 70 to unseat and connect line 30 with line 32, bypassing valve 20 via lines 72 and 74 via vent restriction 73 for expunging trapped air into the engine's burners.

Energizing the start-up solenoid initiates a sequence of events. Besides connecting the fuel lines and passages upstream of valve 20 directly to the burners it admits $P_F$ pressure to chamber 76 on the right end of spool 48 via line 78 which positions the sequencing valve to the left. In so doing $P_F$ pressure is admitted into chamber 52 closing windmill bypass valve 22. Chamber 26 is connected to $P_D$ pressure allowing fuel metered by valve 17 to flow to the burner. Passage 80 formed on spool 48 is uncovered porting $P_F$ pressure to the right-hand side of piston 46, hydraulically latching the valve in the run position. This allows for the start-up solenoid 64 to be de-energized, if desired, closing the flowpath through the vent orifice and reducing the pressure on the small piston area of the sequence valve 40 to decrease somewhat, to the pressure downstream of the minimum pressure and shut-off valve 20. The start-up solenoid 64 need not be de-energized inasmuch as the control will function exactly the same whether or not start-up solenoid 64 is de-energized.

To effectuate shutdown, the sequence of events is as follows: shut-off solenoid 84 is energized connecting chamber 86 of piston 46 to $P_F$ pressure which in turn causes spool 48 of the sequence valve 40 to move to the right connecting chamber 26 of valve 20 to $P_F$ pressure forcing it closed and stopping fuel flow to the engine burner and connecting chamber 52 of valve 22 to $P_D$ pressure allowing it to open and bypass metered fuel flow back to pump inlet. The start solenoid 64 must be de-energized at this time, if it has not already been de-energized, to stop the fuel flow through the vent restriction 73 into the engine burner.

It should be understood that the invention is not limited to the particular embodiments shown and described herein, but that various changes and modifications may be made without departing from the spirit and scope of this novel concept as defined by the following claims.

We claim:

1. A fuel system for a gas turbine engine having a burner and fuel feeding means including a fuel line interconnecting the fuel control and burner, at least a fuel tank and an alternate fuel tank and means for sequentially placing either fuel tank on line so as to interconnect with said fuel control, fuel pumping means in said fuel line interconnected to alternately either of said fuel tanks, in combination with said fuel control which has a minimum pressure and shut-off valve between the fuel metering means of the fuel control and said burner so that fuel is admitted to said burner solely upon reaching a predetermined minimum value, means for expunging trapped air captured in said fuel feeding means including a bypass line bypassing a portion of fuel metered by the fuel metering means around the minimum pressure and shut-off valve, means for actuating said fuel control, means including a fixed restriction and a moveable valve responsive to said actuating means in said bypass line for automatically interconnecting said bypass means to lead air around said minimum pressure and shut-off valve to said burner and a windmill bypass line that interconnects fuel downstream of the fuel metering means and the inlet of said pump and being disposed in parallel flow relationship with said minimum pressure and shut-off valve, and a selector valve also responsive to said actuating means for rendering said windmill bypass line operative whenever said minimum pressure and shut-off valve is actuated closed and said bypass line is actuated open to lead ait to said burner.

* * * * *

UNITED STATES PATENT AND TRADEMARK OFFICE
CERTIFICATE OF CORRECTION

PATENT NO. : 4,449,359
DATED : May 22, 1984
INVENTOR(S) : Edward F. Cole and Dean H. Crombie It is certified that error appears in the above-identified patent and that said Letters Patent is hereby corrected as shown below:

Column 4, line 37 "ait" should be --air--.

Signed and Sealed this

Twenty-fifth Day of December 1984

[SEAL]

Attest:

GERALD J. MOSSINGHOFF

*Attesting Officer*　　*Commissioner of Patents and Trademarks*